Figure 1:
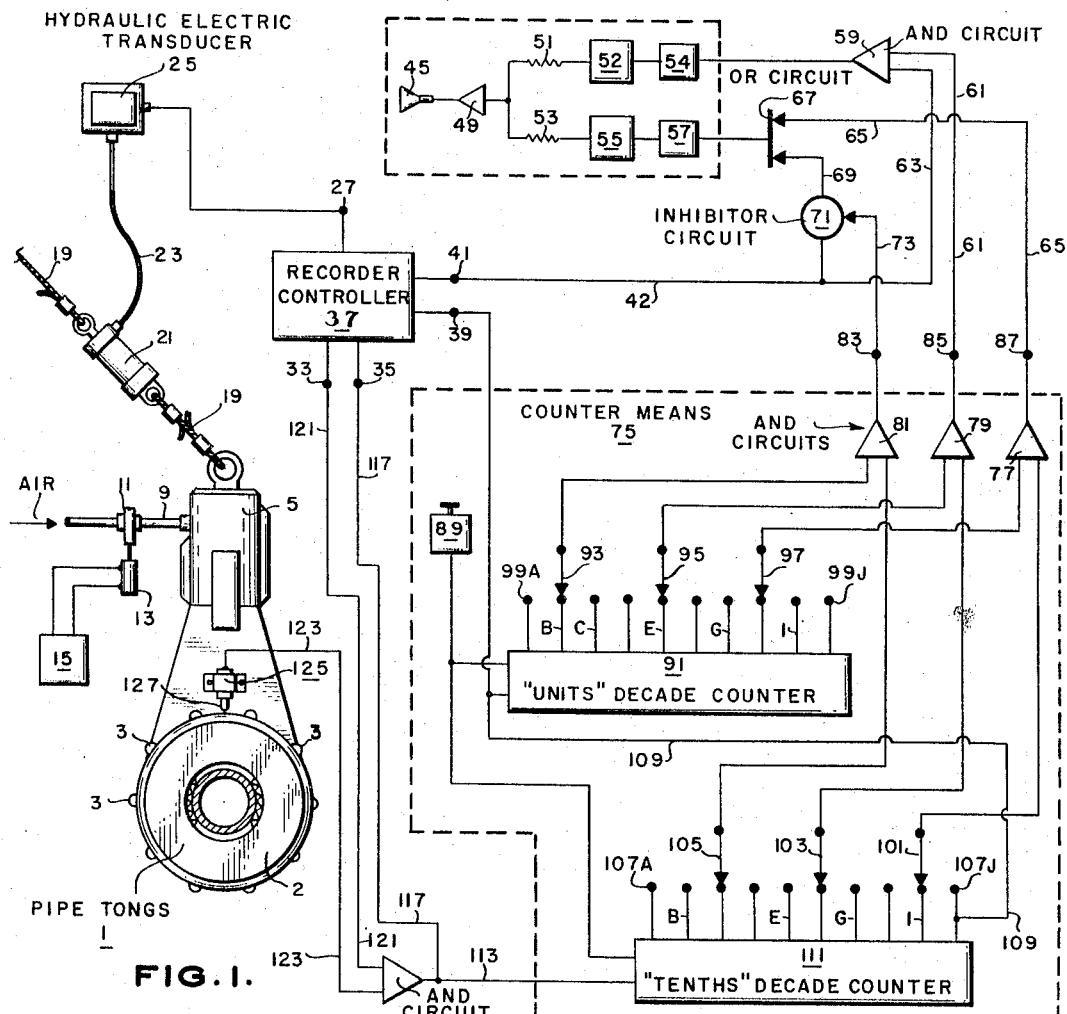

Feb. 13, 1968     G. G. VAN BURKLEO ET AL     3,368,396

ASSEMBLING PIPE STRINGS WITH LEAK-TIGHT JOINTS

Filed Sept. 14, 1964

INVENTORS.
Glenn G. VanBurkleo,
Peter D. Weiner,
BY John B. Davidson

ATTORNEY.

United States Patent Office 3,368,396
Patented Feb. 13, 1968

3,368,396
ASSEMBLING PIPE STRINGS WITH
LEAK-TIGHT JOINTS
Glenn G. Van Burkleo and Peter D. Weiner, Houston,
Tex., assignors, by mesne assignments, to Esso Production Research Company, Houston, Tex., a corporation
of Delaware
Filed Sept. 14, 1964, Ser. No. 396,236
15 Claims. (Cl. 73—139)

This invention relates to apparatus for controlling the operation of power tongs such as are used in the assembly of pipe strings in a well, and more particularly to apparatus for controlling the tightness of coupling of well pipe strings.

After a borehole has been drilled in the earth for the purpose of penetrating hydrocarbon-containing earth formations, pipe strings are run into the borehole to facilitate the flow of connate earth fluids to the earth's surface. The pipe strings are assembled at the well site from pipe string sections each having a pin at one end and a box member at the other end or, alternatively, pins at each end and a double box pipe string section, or coupling collar, therebetween. As the pipe sections are connected together, they are run into the well bore.

The assembly of the pipe string sections is facilitated by the use of a power tong which comprises a rotary jaw member for gripping the well pipe, and a motor for rotating the jaw member until the pipe string sections have been tightened to a desired degree. The joint must be tight enough to prevent leakage and to develop high joint strength. However, the joint must not be so tight as to damage the threads of either the box member or the pin of the connected pipe sections.

In the past a number of techniques have been used to determine the amount of torque required to connect the pipe string sections together with the desired degree of tightness. For example, various methods of applied torque measurements have been used, such as adjusting the air supply maximum output pressure to the pneumatically driven tong motors to provide the required maximum torque as dictated by joint properties and tong power characteristics. Proper torque presumably develops when the tong motor stalls. Other techniques have been used to determine proper joint make-up, such as to measure the number of turns past a varying and unpredictable pin-box member engagement referred to as "hand tight." The accuracy of all of the methods used heretofore is influenced by human factors such as operator skill, attention to duty, and fatigue. Furthermore, where the "hand tight" technique is used, torque may develop early as the result of galled threads in the pin or box member, or the pin or box member may be dirty so that damage to the threads will result should an attempt be made to turn the pin or box member through a predetermined additional number of turns. Also, should a new pin be used in a new box so that the threads' surfaces are not properly mated, "hand tight" torque may develop, but there will be no appreciable amount of torque increase thereafter until a very large number of turns in the coupling has been effected. In either case, the result will be a loose coupling that will leak badly when subjected to internal high pressure. Recent studies have indicated that approximately 85% of the tubing strings in United States oil and gas wells have at least one leaking connection. Considering the number of connections in a pipe string, this may not appear to be too bad until it is realized that one leaking connection in the tubing string of a high pressure gas well can cause a blowout that may result in loss of well.

The present invention provides apparatus for use with the power-actuated tongs of well pipe assembling apparatus, which tongs include a rotatable member for gripping and rotating a section of a well pipe, the assembling apparatus also including means for producing a signal indicative of the torque exerted by the tongs on well pipe. The apparatus of the invention includes first means for producing first, second, and third output signals respectively indicative of the tong having turned the pipe string section through first, second, and third different numbers of revolutions after measurement of a given torque by the torque measuring means. The first, second, and third different numbers of revolutions are of increasing magnitude in the order named. Second means are provided for producing a first output indication responsive to a first input signal thereto and a second output indication responsive to a second input signal thereto. Cnotrol means interconnect the torque measuring means, the first means, and the second means for applying the first input signal to the second means responsive to an indication of a first predetermined torque by the torque measuring means prior to production of the first output signal by the first means. This control means also applies the first input signal to the second means responsive to production of the third output signal by the first means prior to production of an indication of a predetermined torque magnitude by the torque measuring means greater than the first predetermined torque magnitude. In addition, the second input signal is applied to the second means responsive to production of the second output signal by the first means and simultaneous indication of said predetermined torque magnitude by the torque measuring means. In effect, an output indication or warning is produced when a predetermined torque is produced by the tong before a given number of turns has been effected indicating an early make-up condition such as is produced by a new pin in a new box. This warning is also produced when a great number of turns of the coupling are effected before a desired operating torque is reached. A different indication or warning is produced when the desired operating torque is produced with a desired number of turns of the pipe being rotated by the tongs.

Figure 2:
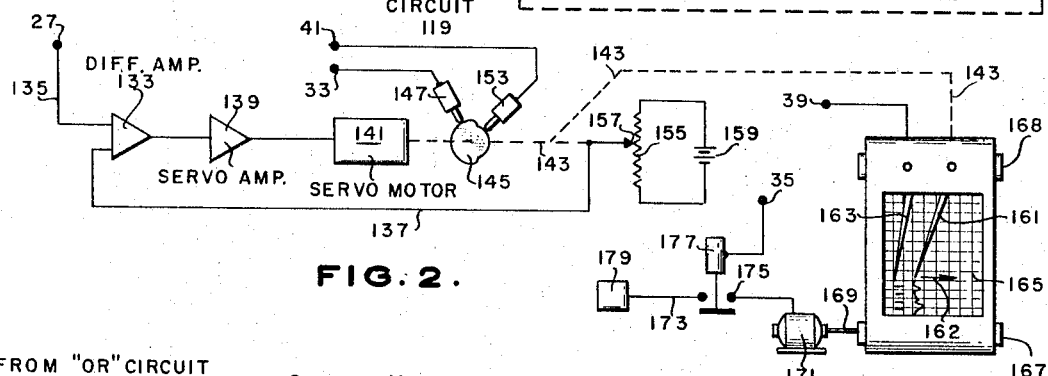
Figure 3:
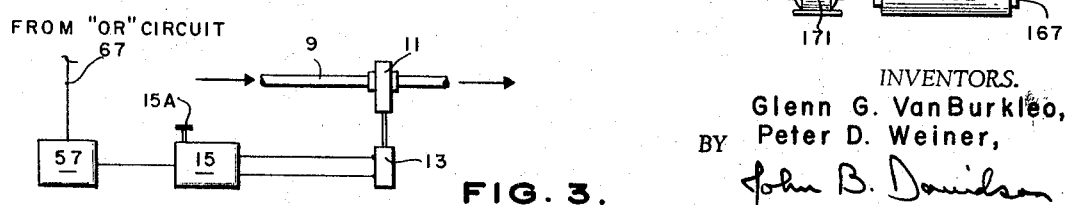

The objects and features of the invention not apparent from the above discussion will become evident upon consideration of the following detailed description of the invention when taken in connection with the accompanying drawing, wherein:

FIG. 1 is a schematic diagram of a preferred embodiment of the invention;
FIG. 2 is a schematic diagram of a recorder controller suitable for use in the apparatus of FIG. 1; and
FIG. 3 is a schematic diagram of a modification of the apparatus of FIG. 1.

With reference now to FIG. 1, there is shown power tongs 1 having a rotatable jaw member 2 for gripping and rotating well pipe string sections, a tong motor 5 which may be energized either by compressed air or pressurized hydraulic fluid, which motor and tongs are connected together by a drive mechanism in the conventional manner. Pipe 9 controlled by valve 11 is connected to motor 5 and to a source of compressed air or pressurized hydraulic fluid (not shown). Apparatus for measuring the torque exerted by the rotary jaw member 2 on well pipe may be incorporated in the tong apparatus according to a number of techniques. For example, a tong torque measuring instrument such as described in the Composite Catalog of Oil Field Equipment and Services, 23d Rev., p. 3192, may be incorporated in the back-up line 19 connected to the tong motor 5. This instrument provides a hydraulic output signal indicative of the torque exerted by the rotatable jaw member, which torque is proportional to the strain in the back-up line 19. The rotary jaw member is provided with a number of lugs or projections 3 for a purpose that will be described below. The hydraulic output signal from tong torque measuring instrument 21 is in the form of a hydraulic signal or force in a line 23 connecting the instrument 21 to a hydraulic-electric transducer 25. The function of transducer 25 is to produce an electrical output signal indicative of or proportional to the hydraulic signal transmitted thereto on line 23. Transducer 25 may be any of a number of types known to the art, such as a Bourdon tube for actuating an electrical resistor, the resistor being connected to a standard voltage source by means of a fixed resistor in series circuit relationship therewith. The signal appearing across the fixed resistor will be indicative of the hydraulic signal applied to the Bourdon tube. Such an apparatus may be a pressure transmitter such as is manufactured by International Resistance Company, 401 North Broad Street, Philadelphia, Pa., and designated Model 70–2006. The output signal of transducer 25 is applied to input terminal 27 of recorder controller 37. The function of recorder controller 37 is to provide an output signal at terminal 33 when the torque signal applied to terminal 27 is of a predetermined magnitude, to produce an output signal at terminal 41 when the torque signal is of a second, larger predetermined magnitude, and to provide a recording of the torque produced by tongs 1 and the number of turns through which the tongs turn a particular well pipe. Suitable apparatus for this purpose is described below in connection with FIG. 2. In addition, a suitable apparatus is manufactured by the F. L. Mosely Company of Pasadena, Calif. and designated as Model 680.

Referring now to FIG. 2, there is illustrated a recording mechanism including a strip chart 165, rollers 167 and 168 for supporting and moving the strip chart, a motor 171 connected to roller 167 by a mechanical connection 169 for rotating roller 167, a source of power 179 for energizing motor 171. Alternatively a drum type of strip chart drive may be used. A relay 177 having a contact 175 in line 173 connects source 179 to motor 171 for the purpose of selectively energizing and de-energizing motor 171. Terminal means 35 is connected to the actuating winding of relay 177 so that an electric signal applied thereto will energize the winding to close contact 175.

Styli 161 and 163 engage strip chart 165 for the purpose of marking data traces on the strip chart. Stylus 163 marks chart 165 in accordance with electrical pulses applied thereto through terminal means 39. Stylus 161 produces a continuous trace on chart 165. Stylus 161 is moved laterally of the direction of chart movement by a mechanical connection 143 from servo motor 141, the lateral excursions being in accordance with the position of the servo motor. The servo motor 141 is controlled in accordance with signals applied thereto from transducer 25 through terminal 27, differential amplifier 133, and servo amplifier 139. The output signal of transducer 25 is applied to differential amplifier 133 by line 135. Amplifier 133 produces an output signal that varies in magnitude in accordance with the difference in the signals derived from a tap 157 on potentiometer 155, the end terminals of which are connected to a constant voltage source 159. The position of tap 157 is varied by servo motor 141. The servo motor drives the tap in such a direction as to minimize the output signal from amplifier 133. This is in accordance with standard practice and will not be further discussed herein.

The servo motor 141 also drives a cam 145 which is used to activate microswitches 147 and 153. As shown, microswitch 147 has been activated to complete a circuit to terminal 33 so as to apply an electrical signal to line 121. When the cam turns clockwise as shown, at a subsequent time corresponding to an indication of large torque from transducer 25, microswitch 153 will be tripped to apply an electrical signal to line 42 through terminal 41. The circuits can be completed through ground and a source of power within the recorder controller (not shown) in the customary manner. Alternatively, the closure of microswitches 147 and 153 can merely complete a circuit for activating or deactivating suitable circuits in the amplifier of FIG. 1 to which they are connected. This is in accordance with standard practice and will not be further discussed herein.

Manifestly, a signal of increasing magnitude applied to terminal 27 will produce a signal of corresponding amplitude on line 135 so as to produce an output signal from amplifier 133. Servo motor 141 will drive cam 145 clockwise and move stylus 161 across chart 165 in the direction shown by arrow 162. Potentiometer tap 157 will be moved in a direction to minimize the difference in the signals applied to amplifier 133 until zero error signal is produced from amplifier 133. If the output signal applied to amplifier 133 through lead 137 progressively increases in amplitude, microswitch 147 will be tripped and, at a later time, microswitch 153 will be tripped. When the tongs 1 are released or backed off, servo motor 141 will drive cam 145 counterclockwise and move stylus 161 in a direction opposite to arrow 162. Microswitches 153 and 147 will be opened in the order named.

Referring again to FIG. 1, a pulsing means, which may be a microswitch having an actuating arm 127, is positioned near rotatable jaw member 2 so that the projections 3 will successively engage actuating arm 127 to momentarily close microswitch 125 as the rotatable jaw member 2 is driven by motor 5. The result is that a series of pulses will be transmitted to AND circuit 119 on line 123. The output signals from recorder controller 37 appearing at terminal 33 are also transmitted to AND circuit 119 through line 121. The signal on line 121 is continuous in nature so that the output of AND circuit 119 on line 113 is a series of pulses concomitant with the pulses applied to the AND circuit on line 123. The output pulses from AND circuit 119 are also applied to terminal 35 through line 117. Actuation of switch 147 serves to actuate relay 177. A suitable relay to be used as relay 177 is manufactured by Potter Brumfield, Preston, Ind.—Model KHP.

The output pulses from AND circuit 119 are applied to a counter means 75 having first, second, and third output terminals 83, 85, and 87. The function of counter means 75 is to count the pulses from AND circuit 119 and to produce output signals at terminals 83, 85, and 87 after pulse counts of predetermined magnitude have been registered by the counter means. The pulse count required to produce an output signal at terminal 83 is less than the pulse count required to produce an output signal at terminals 85 and 87. Likewise, the pulse count required to produce an output signal at terminal 85 is less than that required for terminal 87. A preferred pulse counter for this purpose comprises a pair of decade counters 91 and 111 having a plurality of output circuits which are successively energized by pulses applied thereto and which return to the initial state responsive to a pulse after the last circuit in the sequence has been energized. Pulses from AND circuit 119 applied to counter 111 will transfer conducting states from output circuit 107A through output circuit 107J in sequence. Only certain of the output circuits are designated by reference numerals to avoid unnecessary cluttering the drawing. Likewise, the last output circuit 107J is connected to the input circuit of decade counter 91. The conducting states in the output circuits 99A through 99J are transferred successively, responsive to pulses from counter 111 appearing in output circuit 107J. A manually actuated push button 89 is connected to both of counters 91 and 111 for the purpose of resetting the counters to their initial states whereat output circuits 99A and 107A are activated. Suitable decade counters may be a solid state device such as manufactured by the Accurate Instruments Company of Houston, Tex., and designated as Type OCB, or stepping switches such as are manufactured by Automatic Electric Company of North Lake, Ill., and designated as Type 44. Manifestly, an electrical power source will be connected to such a mechanical stepping switch in accordance with customary practice for mechanical counters of this type.

Selected ones of the output circuits 107A through 107J of counter 111 are connected to the input circuits of AND circuits 81, 79, and 77, the outputs of which are respectively connected to output terminals 83, 85, and 87. Likewise, selected ones of the output circuits 99A through 99J of counter 91 are connected to the other input circuits of AND circuits 81, 79, and 77. The means for selectively connecting the output circuits of the counters to the respective AND circuits may be multi-position switches having a wiper contact connected to a plurality of fixed contacts, the wiper contact being connected to an individual AND circuit input circuit and the fixed contacts being individually connected to each of the output circuits of a given counter. To avoid cluttering the drawing, such apparatuses are not illustrated in detail but are designated by switch members 93, 95, 97, 101, 103, and 105.

A pulse train applied to lead 113 will successively transfer conducting states down the series of output circuits from 107A to 107J, at which time an output pulse will be applied to decade counter 91 through lead 109. The conducting state of counter 91 will transfer to output circuit 99B. When an additional two pulses have been applied to counter 111, AND circuit 81 will be activated inasmuch as signals simultaneously will be applied thereto from output circuits 99B and 107C. This output pulse will correspond to a given rotation of jaw member 2 after a signal has been applied to AND circuit 119 from terminal 33. Likewise, after 4.5 revolutions of jaw member 2, a pulse will be produced by AND circuit 79, and after 8.7 revolutions of jaw member 2, a pulse will be produced by AND circuit 77. When the operator pushes push button 89 the counters will be restored to their initial conditions where output circuits 99A and 107A are energized.

The output signal appearing at terminal 41 is applied through line 42 to an inhibitor circuit 71. This circuit will produce an output signal which will be applied on line 69 to OR circuit 67 until a pulse is applied thereto via line 73 from terminal 83. Terminal 41 is also connected via lines 42 and 63 to an input circuit of AND circuit 59. The other input circuit of AND circuit 59 is connected to terminal 85 through line 61. AND circuit 59 will produce an output signal responsive to a signal from terminal 85 provided that a signal is concurrently being received from terminal 41. The other input circuit of OR circuit 67 is connected through line 65 to terminal 87 so that the OR circuit will produce an output signal responsive to a signal from terminal 87.

Output signals from AND circuit 59 and OR circuit 67 respectively actuate switching circuits 54 and 57. Actuation of switching circuit 54 activates a constant frequency audio oscillator 52 which may have an output signal of 400 c.p.s. Actuation of switching circuit 57 activates a warble oscillator 55 which produces an output signal continuously variable in frequency, for example, a signal continuously swept back and forth between 500 and 1000 c.p.s. The output signals of the oscillators 52 and 55 are connected to a speaker or horn 45 through amplifier 49 and isolating resistors 51 and 53. The apparatus including the oscillators, the switching circuits 54 and 57, the horn 45, and amplifier 49 comprise an indicator means for producing a first output indication responsive to a signal in one input circuit thereof from OR circuit 67, and a second output indication responsive to a signal in a second input circuit thereof from AND circuit 59.

The overall operation of the apparatus described above is as follows. Let it be assumed that the jaw member 2 of tongs 1 has been connected to a pipe string section and that the line 9 supplying motor 5 has been connected to a suitable source of compressed air or pressurized liquid. The operator will actuate mechanical control means 15 for energizing relay 13 to open valve 11. Jaw member 2 will begin rotation to produce pulses on line 123. However, these pulses will not be effective to produce an output signal from AND circuit 119 until a predetermined torque is exerted by jaw member 2 so as to produce an output signal on line 121. Thereafter, AND circuit 119 will produce pulses which will be counted by counting means 75. If the threads of the box or pin members of the pipe sections being connected together should be galled or should be dirty, a torque signal will quickly appear on line 42 which will be transmitted through inhibitor circuit 71 to OR circuit 67 to activate warble oscillator 55. The operator can then quickly release control means 15 to de-energize motor 5. He will then thereupon actuate push button 89 to reset counters 91 and 111 to their original conditions and repair or replace the defective joint.

However, if the threads are not galled or dirty, a pulse will appear on line 73 after a predetermined number of turns of jaw member 2 (in the example, 1.2 turns) to activate inhibitor circuit 71 so that a signal on line 42 will not energize OR circuit 67 through line 69. Should the jaw member turn through an excessively large number of turns without building up a desired operating torque, as when a new box is engaging a new pin and the threads thereof are not properly mated, an output signal will be produced at terminal 87 after the pipe section has been rotated through a given large number of turns (in the example, 8.7 turns). Again, this will produce an output signal from OR circuit 67 to activate the warble oscillator 55.

However, if the desired operating torque builds up after a pulse appears at terminal 83 and before a pulse appears at terminal 87, signals will simultaneously be applied to the input circuits of AND circuit 59 through leads 63 and 61 when the pipe has been rotated through a given number of turns (4.5 turns in the example). This will produce an output signal from AND circuit 59 to activate constant frequency oscillator 52 so that the operator will know that the joint is properly made up, whereupon he can deactivate motor 5 by closing valve 11.

In order to determine the optimum number of turns required for optimum make-up, the following equation is used.

$$N = \frac{\sigma y (c^2 - a^2)(b)}{E(c^2 - b^2)TP}$$

where $N$ = number of turns
$\sigma y$ = yield strength of the material of the coupling members
$c$ = outside diameter of the female member of the coupling
$b$ = pitch diameter
$a$ = inside diameter of the male member
$E$ = Young's Modulus of Elasticity
$T$ = taper of threads
$P$ = pitch of the threads In FIG. 3 there is shown a modification of the invention wherein the first output indication referred to above is the closure of valve 11 to automatically cut off power to motor 5. The output of switching circuit 57 is applied directly to valve actuating means 15 to close valve 11 when an output signal is applied to the switching circuit 57 from OR circuit 67. Switching circuit 57 may be normally closed so that the operator can close a contact to energize the control winding of relay 13 by actuating a push button 15A in series circuit relationship with the switching circuit 57. The output signal from OR circuit 67 or AND circuit 59 will open switching circuit 57 to de-energize the control winding of relay 13 and close valve 11.

The invention is not necessarily to be restricted to the

What is claimed is:

1. Apparatus for use with pipe assembling means for assembling pipe with threadedly interengageable pipe ends, said assembling means having a rotatable member for connection to a section of pipe to rotate the section, said assembling means including torque measuring means for producing an output signal indicative of the torque exerted by said assembling means on the pipe, said apparatus comprising:

first means for producing first, second, and third output signals respectively indicative of the rotatable member having turned through first, second, and third different numbers of revolutions, after measurement of a predetermined minimum torque by said torque measuring means;

second means for producing a first output indication responsive to a first input signal thereto and a second output indication responsive to a second input signal thereto; and means interconnecting said torque measuring means, said first means, and said second means for applying said first input signal to said second means responsive to an indication of a predetermined maximum torque by said torque measuring means prior to production of said first output signal by said first means, for applying said first input signal to said second means responsive to production of said third output signal by said first means prior to production of an indication of said predetermined maximum torque by said torque measuring means, and for applying said second input signal to said second means responsive to production of said second output signal by said first means and an indication of said predetermined maximum torque by said torque measuring means;

said first, second, and third different numbers of revolutions being of increasing magnitude in the order named.

2. Apparatus for use with pipe assembling means for assembling pipe with threadedly interengageable pipe ends, said assembling means having a rotatable member for connection to a section of pipe to rotate the section, said assembling means including torque measuring means for producing an output signal indicative of the torque exerted by said assembling means on the pipe, said apparatus comprising:

first means for producing first, second, and third output signals respectively indicative of the rotatable member having turned through first, second, and third different numbers of revolutions, after measurement of a predetermined minimum torque by said torque by said torque measuring means;

second means for producing a first output indication responsive to a first input signal thereto and a second output indication responsive to a second input signal thereto;

first circuit means interconnecting said torque measuring means, said first means, and said second means for applying said first input signal to said second means responsive to an indication of a predetermined maximum torque by said torque measuring means prior to production of said first output signal by said first means and also for applying said first input signal to said second means responsive to production of said third output signal by said first means prior to production of an indication of said predetermined maximum torque by said torque measuring means;

second circuit means interconnecting said torque measuring means, said first means, and said second means for applying said second input signal to said second means responsive to production of said second output signal by said first means and an indication of said predetermined maximum torque by said torque measuring means;

said first, second, and third different numbers of revolutions being of increasing magnitude in the order named.

3. Apparatus for use with pipe assembling means for assembling pipe with threadedly interengageable pipe ends, said assembling means having a rotatable member for connection to a section of pipe to rotate the section, said assembling means including torque measuring means for producing an output signal indicative of the torque exerted by said assembling means on the pipe, said apparatus comprising:

first means for producing first, second, and third output signals respectively indicative of the rotatable member having turned through first, second, and third different numbers of revolutions, after measurement of a first predetermined torque magnitude by said torque measuring means;

second means for producing a first output indication responsive to a first input signal thereto and a second output indication responsive to a second input signal thereto;

inhibiting circuit means for connection to said torque measuring means and connected to said first means for producing an output signal responsive to production by said torque measuring means of a signal indicative of a second predetermined torque magnitude exerted by said assembling means prior to production of said first output signal by said first means;

first circuit means connecting said first means and said inhibiting circuit means to said second means for supplying said first input signal to said second means responsive to production of an output signal by said inhibiting circuit means, and also for supplying said first input signal to said second means responsive to production of said third output signal by said first means;

second circuit means interconnecting said torque measuring means, said first means, and said second means for applying said second input signal to said second means responsive to production of said second output signal by said first means and an indication of said second predetermined torque magnitude by said torque measuring means;

said first, second, and third different numbers of revolutions being of increasing magnitude in the order named.

4. Apparatus for use with pipe assembling means for assembling pipe having threadedly interengageable ends, said assembling means having a rotatable member for connection to a section of well pipe to rotate the section, comprising:

first means for connection to said assembling means for producing a hydraulic signal indicative of the torque exerted by said assembling means on pipe;

hydraulic-electric transducer means connected to said first means for converting said hydraulic signal to a corresponding electrical signal;

pulsing means for operatively engaging said assembling means to produce a pulse upon each rotation of said rotatable member through a predetermined angle;

controller means connected to said transducer means and having first and second output circuits, for producing a signal in said first output circuit when the output signal of said transducer means is indicative of a predetermined minimum torque, and for producing a signal in said second output circuit when the output signal of said transducer means is indicative of a desired coupling torque;

first circuit means connected to said first output circuit and to said pulsing means for producing a pulse responsive to each pulse received from said pulsing means when a signal is present in said first output circuit;

counter means having first, second, and third output circuits connected to said first circuit means for counting pulses received from said first circuit means, and for producing output signals in said first, second, and third output circuits thereof after pulse counts of predetermined magnitude have been registered by said counter means, the pulse count required to produce an output signal in each of said counter means' first, second, and third output circuits being of increasing magnitude for the counter means' output circuits in the order named;

inhibiting circuit means connected to said counter means's first output circuit for producing an output signal responsive to production of a signal in said controller means' second output circuit prior to production of a signal in said counter means' first output circuit, production of a signal in said counter means' first output circuit activating said inhibiting circuit means to prevent production of an output signal thereby responsive to production of a signal in said controller means' second output circuit;

indicator means having first and second input circuits for producing a first output indication responsive to a signal in said first input circuit, and a second output indication responsive to a signal in said second input circuit;

means coupling the output of said inhibiting circuit means and said counter means' third output circuit to said indicator means' first input circuit; and means connected to said controller means' second output circuit and to said counter means' second output circuit for producing a signal in said indicator means' second input circuit upon simultaneous production of signals in said controller means' second output circuit and said counter means' second output circuit.

5. Apparatus for use with pipe assembling means for assembling pipe having threadedly interengageable ends, said assembling means having a rotatable member for connection to a second well pipe to rotate the section, comprising:

first means for connection to said assembling means for producing a signal indicative of the torque exerted by said assembling means on pipe;

pulsing means for operatively engaging said assembling means to produce a pulse upon each rotation of said rotatable member through a predetermined angle;

controller means connected to said first means and having first and second output circuits, for producing a signal in said first output circuit when the output signal of said first means in indicative of a predetermined minimum torque, and for producing a signal in said second output circuit when the output signal of said first means is indicative of a desired coupling torque;

first circuit means connected to said output circuit and to said pulsing means for producing a pulse responsive to each pulse received from said pulsing means when a signal is present in said first output circuit;

counter means having first, second, and third output circuits connected to said first circuit means for counting pulses received from said first circuit means, and for producing output signals in said first, second, and third output circuits thereof after pulse counts of predetermined magnitude have been registered by said counter means, the pulse count required to produce an output signal in each of said counter means' first, second, and third output circuits being of increasing magnitude for the counter means' output circuits in the order named;

inhibiting circuit means connected to said counter means' first output circuit for producing an output signal responsive to production of a signal in said controller means' second output circuit prior to production of a signal in said counter means' first output circuit, production of a signal in said counter means' first output circuit activating said inhibiting circuit means to prevent production of an output signal thereby responsive to production of a signal in said controller means' second output circuit;

indicator means having first and second input circuits for producing a first output indication responsive to a signal in said first input circuit, and a second output indication responsive to a signal in said second input circuit;

means coupling the output of said inhibiting circuit means and said counter means' third output circuit to said indicator means' first input circuit; and means connected to said controller means' second output circuit and to said counter means' second output circuit for producing a signal said indicator means' second input circuit upon simultaneous production of signals in said controller means' second output circuit and said counter means' second output circuit.

6. Apparatus for use with pipe assembling means for assembling pipe having threadedly interengageable ends, said assembling means having a rotatable member for connection to a section of well pipe to rotate the section, comprising:

first means for connection to said assembling means for producing a signal indicative of the torque exerted by said assembling means on pipe;

pulsing means for operatively engaging said assembling means to produce a pulse upon each rotation of said rotatable member through a predetermined angle;

controller means connected to said first means and having first and second output circuits, for producing a signal in said first output circuit when the output signal of said first means is indicative of a predetermined minimum torque, and for producing a signal in said second output circuit when the output signal of said first means is indicative of a desired coupling torque;

first circuit means, including counter means having first, second, and third output circuits, connected to said controller means' first output circuit and to said pulsing means for counting pulses from said pulsing means when a signal is in said controller means' first output circuit, and for producing output signals in said counter means' output circuits after counts of predetermined magnitude have been registered thereby, the pulse count required to produce a signal in each of said counter means' first, second, and third output circuits being of increasing magnitude for the counter means' output circuits in the other named;

inhibiting circuit means connected to said counter means' first output circuit for producing an output signal responsive to production of a signal in said controller means' second output circuit prior to production of a signal in said counter means' first output circuit, production of a signal in said counter means' first output circuit activating said inhibiting circuit means to prevent production of an output signal thereby responsive to production of a signal in said controller means' second output circuit;

indicator means having first and second input circuits for producing a first output indication responsive to a signal in said first input circuit, and a second output indication responsive to a signal in said second input circuit;

means coupling the output of said inhibiting circuit means and said counter means' third output circuit to said indicator means' first input circuit; and means connected to said controller means' second output circuit and to said counter means' second output circuit for producing a signal in said indicator means' second input circuit upon simultaneous production of signals in said controller means' second output circuit and said counter means' second output circuit.

7. Apparatus for use with pipe assembling means for assembling pipe having threadedly interengageable ends, said assembling means having a rotatable member for connection to a section of well pipe to rotate the section, comprising:

first means for connection to said assembling means for producing a signal indicative of the torque exerted by said assembling mean on pipe;

pulsing means for operatively engaging said assembling means to produce a pulse upon each rotation of said rotatable member through a predetermined angle;

controller means connected to said first means and having first and second output circuits, for producing a signal in said first output circuit when the output signal of said first means is indicative of a predetermined minimum torque, and for producing a signal in said second output circuit when the output signal of said first means is indicative of a desired coupling torque;

first circuit means, including counter means having first, second, and third output circuits, connected to said controller means' first output circuit and to said pulsing means for counting pulses from said pulsing means when a signal is in said controller means' first output circuit, and for producing output signals in said counter means' output circuits after counts of predetermined magnitude have been registered thereby, the pulse count required to produce a signal in each of said counter means' first, second, and third output circuits being of increasing magnitude for the counter means' output circuits in the order named;

indicator means having first and second input circuits for producing a first output indication responsive to a signal in said first input circuit, and a second output indication responsive to a signal in said second input circuit;

second circuit means connected to said indicator means' first input circuit, to said counter means' first output circuit, and to said controller means' second output circuit for producing a signal in said indicator means' first input circuit responsive to production of a signal in said controller means' second output circuit prior to production of a signal in said counter means' first output circuit, said second circuit means further coupling said counter means' third output circuit to said indicator means, first input circuit; and means connected to said controller means' second output circuit to said counter means' second output circuit for producing a signal in said indicator means' second input circuit upon simultaneous production of signals in said controller means' second output circuit and said counter means' second output circuit.

8. Apparatus for use with pipe assembling means for assembling pipe having threadedly interengageable ends, said assembling means having a rotatable member for connection to a section of well pipe to rotate the section, comprising:

first means for connection to said assembling means for producing a signal indicative of the torque exerted by said assembling means on pipe;

pulsing means for operatively engaging said assembling means to produce a pulse upon each rotation on said rotatable member through a predetermined angle;

controller means connected to said first means and having first and second output circuits, for producing a signal in said first output circuit when the output signal of said first means is indicative of a predetermined minimum torque, and for producing a signal in said second output circuit when the output signal of said first means is indicative of a desired coupling torque;

first circuit means, including counter means having first, second, and third output circuits, connected to said controller means' first output circuit and to said pulsing means for counting pulses from said pulsing means when a signal is in said controller means' first output circuit, and for producing output signals in said counter means' output circuits after counts of predetermined magnitude have been registered thereby, the pulse count required to produce a signal in each of said counter means' first, second, and third output circuits being of increasing magnitude for the counter means' output circuits in the order named;

indicator means having first and second input circuits for producing a first output indication responsive to a signal in said first input circuit, and a second output indication responsive to a signal in said second circuit;

second circuit means connected to said indicator means' input circuits, to said counter means' output circuits, and to said controller means' second output circuit, for producing a signal in said indicator means' first input circuit responsive to production of a signal in said counter means' third output circuit, and also responsive to production of a signal in said controller means' second output circuit prior to production of a signal in said counter means' first output circuit, and also for producing a signal in said indicator means' second input circuit upon simultaneous production of signals in said controller means' second output circuit and said counter means' second output circuit.

9. Apparatus for selectively producing an output indication for indicating proper pipe makeup with pipe assembling means adapted to connect together pipe sections having threadedly interengageable ends, said assembling means having a rotatable member for connection to a section of well pipe for rotating the section, said apparatus comprising:

torque measuring means for connection to said assembling means for measuring the torque exerted by said assembling means and producing an output indication indicative thereof;

first means for sensing the number of revolutions turned by said rotatable member after production of a first predetermined torque indication by said torque measuring means; and second means connected to said first means and to said torque measuring means for producing said output indication when a second predetermined torque indication is produced by said torque measuring means after said first means senses a first predetermined number of revolutions and before said first means senses a second predetermined number of revolutions.

10. The apparatus of claim 9 further including third means for producing a counteroutput indication when said second predetermined torque indication is produced before said first means senses said predetermined number of revolutions, and when said second predetermined torque indication is not produced by said torque indicating means before said first means senses said second predetermined number of revolutions.

11. The apparatus of claim 10 further including disconnect means for disconnecting the pipe assembling means from its power source responsive to an actuating signal applied thereto, and means connected to said disconnect means and to said second and third means for applying an actuating signal to said disconnect means responsive to output indications from said second means and to output indications from said third means.

12. A method of making up a length of pipe string comprising a pair of pipe string sections having mating screw-threaded ends, said method comprising:
threadedly interengaging said pipe string section ends until a predetermined torque is required to further threadedly interengage said ends; and
thereafter, further threadedly interengaging said ends for at least a predetermined number of turns of one pipe string section relative to the other until a second predetermined torque is required to further threadedly interengage said ends.

13. A method of making up a length of pipe string comprising a pair of pipe string sections having mating screw-threaded ends, said method comprising:
threadedly interengaging said pipe string section ends until a first predetermined torque is required to further threadedly interengage said ends;
thereafter, further threadedly interengaging said ends; discontinuing said further threaded interengagement of said ends upon occurrence of one of the following:
(1) attainment of a second predetermined torque greater than said first predetermined torque prior to a first predetermined number of turns of one pipe string section relative to the other,
(2) threaded interengagement of said ends for a second predetermined number of turns without attainment of said second predetermined torque,
(3) threaded interengagement of said ends for a third predetermined number of turns greater than said first and less than said second predetermined number of turns, and attainment of said second predetermined torque.

14. Apparatus for use with well pipe assembling means, said well pipe assembling means having rotating means for gripping and rotating a section of well pipe and including torque measuring means for producing an output signal indicative of the torque exerted by said well pipe assembling means on said well pipe, said apparatus comprising:
signal generating means for connection to said well pipe assembling means for producing output signals indicative of the distance turned by said rotating means while gripping the well pipe; and
means for connection to the torque measuring means and connected to said signal generating means responsive to the output signals of said torque measuring means and of said signal generating means to produce a warning signal when the output signal from said torque measuring means reaches a preselected value when the output signal from said signal generating means is within a preselected range of values.

15. Apparatus for use with well pipe assembling means, said well pipe assembling means having rotating means for gripping and rotating a section of well pipe and including torque measuring means for producing an output signal indicative of the torque exerted by said well pipe assembling means on said well pipe, said apparatus comprising:
signal generating means for connection to said well pipe assembling means for producing output signals indicative of the distance turned by said rotating means while gripping the well pipe; and
means for connection to the torque measuring means and connected to said signal generating means responsive to the output signals of said torque measuring means and of said signal generating means to produce a first warning signal when the output signal from said torque measuring means reaches a preselected value when the output signal from said signal generating means is within a preselected range of values, and to produce a second warning signal when the output signal from said torque measuring means reaches said preselected value when the output signal from said signal generating means is outside said preselected range of values.

References Cited

UNITED STATES PATENTS

| | | | |
|---|---|---|---|
| 1,907,461 | 5/1933 | Sunde | 73—139 |
| 1,985,916 | 1/1935 | Coates et al. | 73—139 XR |
| 2,527,456 | 10/1950 | Schmeling | 73—139 |
| 2,756,622 | 7/1956 | La Belle | 73—139 XR |

RICHARD C. QUEISSER, *Primary Examiner.*

C. A. RUEHL, *Assistant Examiner.*